July 13, 1926.

F. H. GLEASON 1,592,199

LUBRICANT DISTRIBUTION SYSTEM

Filed Nov. 12, 1921

Inventor.
F. H. Gleason
by T. F. Bourne
his Atty

Patented July 13, 1926.

1,592,199

UNITED STATES PATENT OFFICE.

FREDERICK H. GLEASON, OF BROOKLYN, NEW YORK.

LUBRICANT-DISTRIBUTION SYSTEM.

Application filed November 12, 1921. Serial No. 514,504.

The object of my invention is to provide means to accurately control the volume of oil delivered at the outlets of an oil tubing distribution system, said outlets being located at varying distances and varying levels from a single source of oil supply.

In accordance with my invention I provide a tubing distribution system for oil comprising a source of oil supply from which extend a plurality of tubes adapted to deliver oil to various outlets, said tubes having bores of such diameter as provide means for determining the oil pressures developed at the various outlets with respect to the oil supply source, whereby such oil pressures at the various outlets will control the volume of oil delivered at the corresponding outlet during a certain interval of time. One of the features of my invention is to provide for delivering oil to various bearings of an automobile chassis in such manner that, with a constant or given pressure in the oil supply source or header of the distribution system, the oil pressure at each of the aforesaid outlets will be predetermined so that equal, greater, or less pressures at the respective outlets at the bearings to be lubricated will be produced in accordance with the desired volume of oil to be delivered at each of the aforesaid outlets.

My invention comprises novel details of improvement that will be more fully hereinafter set forth and then pointed out in the claims.

Figure 1:
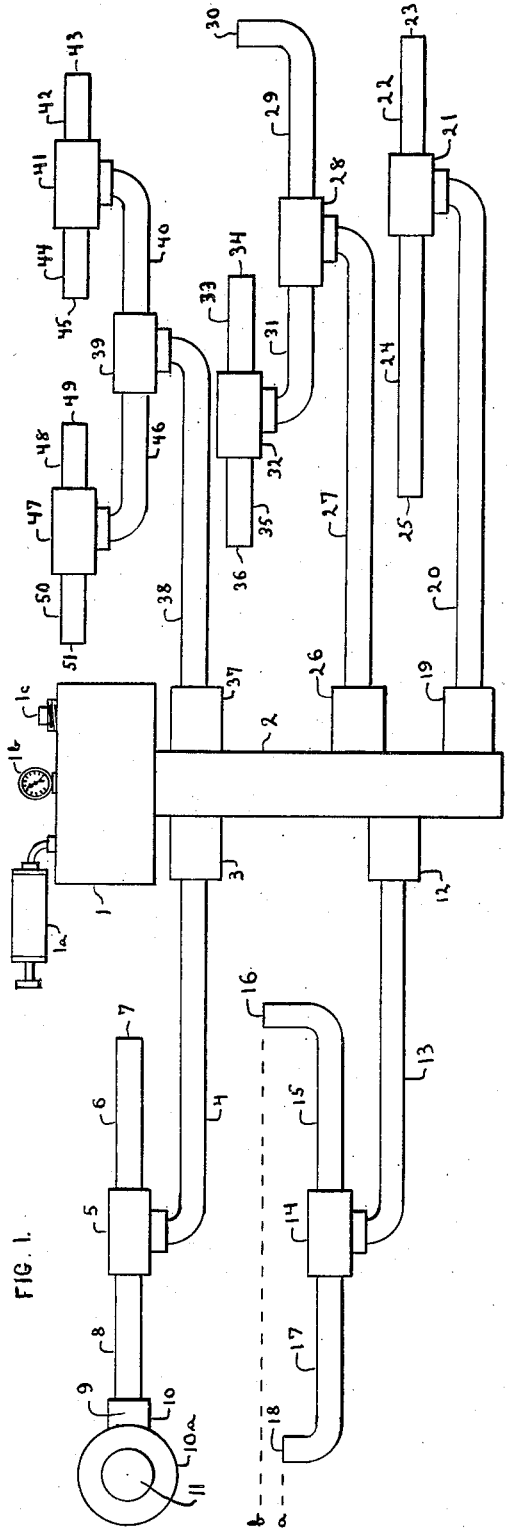
Figure 2:
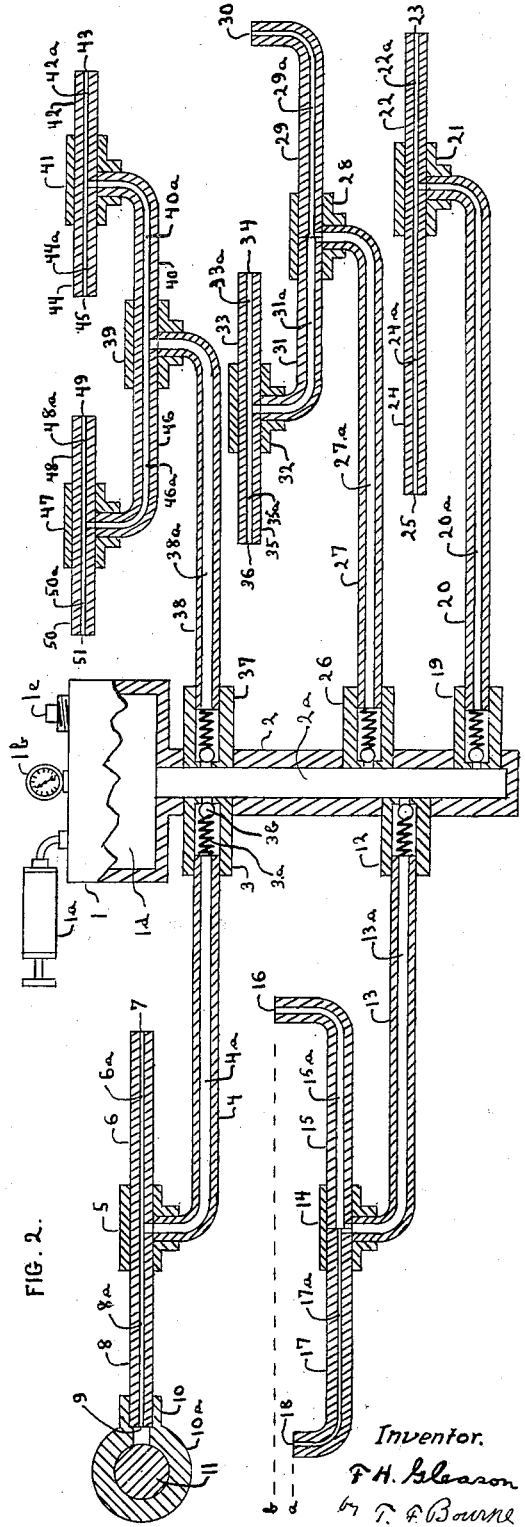

Reference is to be had to the accompanying drawings forming part hereof, wherein Figure 1 is a face view of a tubing distribution system embodying my invention, and Fig. 2 is a longitudinal section of Fig. 1.

Similar numerals of reference indicate corresponding parts in both the views.

The numeral 1 indicates an oil supply tank shown provided with a filler plug $1^c$, an ordinary air pump $1^a$ to produce air pressure on the oil in the supply tank, and a gauge $1^b$ to indicate the pressure. The tank 1 may deliver a predetermined volume of oil under a predetermined pressure to distributing header or supply chamber 2. The aforesaid oil pressure and the volume of oil to be delivered at a given time or for a given period may be produced by any other suitable means, such as the oil feeding apparatus set forth in my application for Letters Patent on automobile chassis lubricating devices, filed Sept. 6th, 1921, Serial No. 498,-740. Any desired number of conduits or tubes 4, 13, 20, 27, and 38 may communicate with the oil receiving space $2^a$ of header or chamber 2, hence with tank 1, as by means of the respective fittings 3, 12, 19, 26 and 37. Check valves $3^b$, normally held to their seats by springs $3^a$ in said fittings, serve to permit the flow of oil to the respective conduits or tubes and prevent the return flow of oil or air from said conduits to said header. The conduits may have varying lengths, according to the distance of the respective outlets to be fed therethrough from the header 2, and the conduits will have bores proportioned to their length and the number of outlets fed thereby, whereby a predetermined drop in pressure will be caused at the outlets.

The conduits may have two or more outlets, parts of the bores of said conduits may be of varied size to develop the required pressures at said two or more outlets to feed or deliver the required volume of oil at each of the two or more outlets as compared with each other and with the volume of oil delivered by the main conduit from the header. Conduit 4 is shown connected with fitting 5 from which tubes 6 and 8 of equal length extend, having their respective outlets 7 and 9 on a substantially common plane or level. Tube 8 is shown with the outlet 9 connected with the boss 10 of bearing $10^a$ in which the shaft 11 revolves. Said bearing is illustrative of any desired bearing to which the several outlets may lead. The bore $4^a$ of conduit 4 is sufficiently large to supply the required volume of oil to the bores $6^a$ and $8^a$. The bore $4^a$ of tube 4 is such as to cause a predetermined drop in pressure at the T 5, and the bores $6^a$ and $8^a$ of tubes 6 and 8 each have one-half the area of the bore $4^a$. Since the length of the tubes 6 and 8 is equal, the resistance of the internal walls of the bores $6^a$ and $8^a$ to the flow of oil through tubes 6 and 8 will be equal, and the pressures developed at the outlets 7 and 9 will be equal, so that both outlets will deliver substantially equal volumes of oil in a specified interval of time, that is, each outlet 7 and 9 will deliver one-half of the volume of oil delivered by tube 4 to fitting 5. The check valve in fitting 3 attached to header 2 prevents the entrance of air or oil to tube 4 after the pressure is removed from header 2. Tube 4 will remain full of oil from fitting 3 to fitting 5 after the pressure is removed from the header 2ª, and since outlets 7 and 9 are level with each other no delivery of oil will take place at said outlets after the pressure is removed within header 2ª. Similar constructions like line 4 can be arranged to deliver different volumes of oil at the outlets; for instance a tube 4 with a very small bore, will cause a great drop in pressure per unit length so that very low pressures are finally produced at the delivery outlets, while a tube 4 with a larger bore will produce a smaller drop in pressure per unit length so that much higher pressures will be developed at its delivery outlets. Since both constructions are supplied from header 2ª with oil under the same pressure for the same interval of time, the pair of outlets having the greatest pressures will deliver greater volumes of oil than the pair of outlets having the lower pressures.

The conduit 13 has two outlets 16 and 18, which are shown on different levels. The bore 13ª of tube 13 is of such area as to cause a predetermined drop in pressure at the T fitting 14, the bore 15ª of tube 15 has two thirds the area of bore 13ª, and bore 17ª of tube 17 has one third the area of bore 13ª, and tubes 15 and 17 are of equal length. The resistance to the flow of oil in bore 15ᵉ is less than the resistance to the flow of oil in bore 17ª and the pressure developed at outlet 16 is greater than the pressure developed at outlet 18, hence outlet 16 will deliver two thirds of the volume of oil and outlet 18 will deliver one third of the volume of oil delivered to fitting 14 by tube 13. The check valve in fitting 12 attached to the header 2 prevents the entrance of air or oil to tube 13 when the pressure is removed from header 2. Tube 13 will remain full of oil from fitting 12 to fitting 14. Outlet 18 is lower than outlet 16, air will enter tube 15 at outlet 16 after the pressure is removed from header 2, and the volume of oil in bore 15ª for a distance a—b equal to the difference in levels of the outlets 16 and 18 will drain out of outlet 18. By keeping the supply tubes below the level of the delivery outlets the drainage of the oil in bores 15ª and 17ª of tubes 15 and 17 is practically eliminated.

The conduit 20 has two outlets 23 and 25. The bore 20ª of tube 20 is of such area as to cause a predetermined drop in pressure at the T fitting 21, the bore 22ª, and 24ª of tubes 22 and 24 has one half the area of bore 20ª of tube 20; tube 22 is one half as long as tube 24; the resistance to the flow of oil in bore 22ª is less than the resistance to the flow of oil in bore 24ª; hence the pressure developed at outlet 23 is greater than the pressure developed at outlet 25. Outlet 23 will deliver two thirds of the volume of oil and outlet 25 will deliver one third of the volume of oil delivered to T 21 by tube 20. The check valve in fitting 19 attached to header 2 prevents the entrance of air or oil to tube 20 after the pressure is removed from header 2. Tube 20 will remain full of oil from fitting 19 to fitting 21, and since outlets 23 and 25 are level no delivery of oil will take place at said outlets after the pressure is removed from header 2. In this construction allowance may be made in adjusting the compared lengths of tubes 22 and 24 so that the final volumes of oil delivered at outlets 23 and 25 may be any desired per cent of the volume of oil delivered to fitting 21 by tube 20.

The conduit 27 has three outlets 30, 34 and 36. The bore 27ª of tube 27 is of such area as to cause a predetermined drop in pressure at the T fitting 28; the bore 29ª of tube 29 has one third the area of bore 27ª of tube 27; tube 31 connects with T fitting 32; the bore 31ª of tube 31 has two thirds the area of bore 27ª of tube 27, the bores 33ª, 35ª of tubes 33, 35 each have one half the area of bore 31ª of tube 31. The resistance to the flow of oil in bore 29ª is equal to the resistance to the flow of oil in bores 31ª, 33ª and 35ª, the pressures developed at outlets 30, 34 and 36 are equal, and each of said outlets delivers one third of the volume of oil delivered by tube 27 to T 28. The check valve in fitting 26 is attached to header 2 prevents the entrance of air or oil to tube 27 after the pressure is removed from header 2. Tube 27 will remain full of oil from fitting 26 to T 28; outlets 30, 34 and 36 are level with each other, and no delivery of oil will take place after the pressure is removed from within header 2ª. Thus the conduit delivers equal volumes of oil under a given pressure at the three outlets.

In accordance with the construction shown respecting conduit 38, the same will deliver equal volumes of oil to four outlets 43, 45, 49 and 51. Tube 38 is shown connected to fitting 37 and to a T fitting 39. Tubes 40 and 46 extend from fitting 39 to fittings 41 and 47 respectively. Tubes 42 and 44 extend from fitting 41 and respectively have outlets 43 and 45, and tubes 48 and 50 extend from fitting 47 and respectively have outlets 49 and 51. The volumes of oil delivered at outlets 43, 45, 49 and 51 in relation to the volumes of oil delivered at the other outlets of the system is controlled by providing tube 38 with a bore 38ª that will cause a predetermined drop in pressure at fitting 39 while the bores 40ª, 46ª of tubes 40 and 46 each have one half the area of bore 38ª of tube 38, and the bores 42ª, 44ª 48ª and 50ª of tubes 42, 44, 48 and 50 each have one half the area of bore 40ª of tube 40 or of bore 46ª of tube 46. The resistance to the flow of oil in bores 40ª, 42ª and 44ª is equal to the resistance to the flow of oil in bores 46ª 48ª and 50ª. The pressures developed at outlets 43, 45, 49 and 51 will be equal and each outlet will deliver one quarter of the volume of oil delivered by tube 38 to T 39. The check valve in fitting 37 attached to header 2 prevents the entrance of air or oil to tube 38 after the pressure is removed from header 2. Tube 38 from fitting 37 to fitting 39 will remain full of oil; outlets 43, 45, 49 and 51 are on the same level and no delivery of oil will take place from said outlets after the pressure is removed from within header 2ª.

By means of my improvements the various outlets of the distribution system may be connected with the bearings of the different parts of machinery to be lubricated, such as the bearings of an automobile chassis, the transmission bearings, and the like, so that with a given pressure and volume within header 2 a predetermined volume of oil will be delivered to any bearing as compared with any other bearing. The construction described provides an oil distribution system wherein assurance may be had that, with a given pressure and volume of oil in the header, the various bearings fed by the different outlets of the system will always receive the desired amount of lubricant although some of the bearings may be more distant than others from the central source of oil distribution and require different volumes of oil.

The general operation of the distribution system is as follows: A certain volume of oil supplied to header 2 under a certain pressure will produce certain predetermined pressures at each of the several outlets of the system for the same interval of time, since the volume of oil delivered by a tube is controlled by the pressure at the point of delivery and the interval of time that this pressure is applied; the predetermined pressures produced at the various outlets all for the same interval of time will directly control the volume of oil delivered at each specified outlet. Equal, greater, or less pressures can be produced at any of the outlets in relation to each other so that any desired per cent of the volume of oil delivered to header 2 can be delivered at any specified outlet at any specified distance or level from the supply header 2.

While I have illustrated and described a particular arrangement of tubes and fittings, it will be understood that the general arrangement and disposition of parts may be installed in any desired directions from the central source that may be required to meet the necessities for bearings or other parts to be lubricated, and that my invention is not limited to the particular details of construction set forth, since the same may be varied, within the scope of the appended claims, without departing from the spirit of my invention.

Having now described my invention, what I claim is:

1. An automobile lubricating system consisting in combination with the chassis-bearings of an automobile of a source of lubricant supply, a header in communication with said source of supply, a main conduit leading from said header, a valve controlling communication between the header and the main conduit, a plurality of branch conduits connected to the main conduit and leading therefrom to chassis bearings, said branch conduits having bores of different cross-sectional areas whereby lubricant is supplied to the respective bearings under different pressures.

2. An oil distributing system for the chassis bearings of an automobile comprising means for supplying oil under pressure, a tube in communication with said oil supply, a normally closed valve in such communication opened by pressure of the lubricant in the oil-supply means, a plurality of tubes connected with the first-named tube for conveying oil from the first-named tube to a plurality of bearings, said last-named tubes having bores of such relative cross-sectional area and of such relative length as to supply a relatively regulated quantity of oil to each bearing.

3. An oil distributing system for the chassis bearings of an automobile, comprising means for supplying oil under pressure, a tube in communication with said oil supply, a normally closed valve in such communication opened by pressure of the lubricant in the oil-supply means, a plurality of tubes connected with the first-named tube for conveying oil from the first-named tube to a plurality of bearings, said last-named tubes having bores of such relative cross-sectional area and of such different relative length as to supply a relatively regulated quantity of oil to each bearing.

4. In an automobile lubricating system consisting, in combination with the chassis-bearings of an automobile, of a source of lubricant-supply, a main conduit leading from said source of supply, a plurality of branch conduits connected to the main conduit and leading therefrom to chassis bearings, said branch conduits having bores of different cross-sectional areas whereby lubricant is supplied to the respective bearings under different pressures.

5. In an automobile lubricating system consisting, in combination with the chassis bearings of an automobile, of a source of lubricant supply, a main conduit leading from said source of supply a plurality of branch conduits connected to the main conduit and leading therefrom to chassis bearings, said branch conduits having bores of different cross-sectional areas whereby lubricant is supplied to the respective bearings under different pressures.

6. An oil distributing system for the chassis bearings of an automobile comprising means to deliver oil under pressure, a primary tube communicating therewith, a fitting connected to said tube, and secondary tubes extending from said fitting and communicating with the primary tube and with each other, one of said secondary tubes having a bore of greater cross-sectional area than the other secondary tube, a fitting attached to the secondary tube having the bore of greater cross sectional area and additional secondary tubes extending from said fitting.

7. The method of automatically distributing relatively regulated quantities of oil to the chassis bearings of an automobile by a piping system from a common source of supply to the respective bearings comprising forming the pipes of the said system leading to the respective bearings with bores of such relative different cross-sectional area and bores of such relative length that the friction resistance to the flow of oil under pressure to the respective bearings thru the bores of the respective pipes determines the relative quantity of oil supplied to each bearing.

8. The method of automatically distributing relatively regulated quantities of oil to the chassis bearings of an automobile by a piping system from a common source of supply to the respective bearings, comprising forming the pipes of the said system leading to the respective bearings with bores of such relative different cross-sectional area and bores of such relative length that the friction resistance to the flow of oil under pressure to the respective bearings thru the bores of the respective pipes determines the relative quantity of oil supplied to each bearing, and the relative pressure under which the oil is supplied to each bearing.

9. The method of automatically distributing relatively regulated quantities of oil to the chassis bearings of an automobile by a piping system from a common source of supply to the respective bearings, comprising forming the pipes of the said system leading to the respective bearings from a common outlet with bores of such different relative cross-sectional area and bores of such relative length that the friction resistance to the flow of oil under pressure to the respective bearings through the bores of the respective pipes determines the relative quantity of oil supplied to each bearing.

10. The method of automatically distributing relatively regulated quantities of oil to the chassis bearings of an automobile by a piping system from a common source of supply to the respective bearings comprising forming the pipes of the said system leading to the respective bearings with bores of such relative different cross-sectional area and bores of such different relative length that the friction resistance to the flow of oil under pressure to the respective bearings through the bores of the respective pipes determines the relative quantity of oil supplied to each bearing.

11. An automobile lubricating system comprising, in combination with the chassis-bearings of an automobile, a source of lubricant supply, a header in communication with the source of supply, a main conduit leading from said source of supply and terminating in an outlet, a valve controlling communication between the header and the main conduit and a plurality of branch conduits connected to the outlet from the main conduit and having bores of different cross-sectional areas whereby lubricant is supplied to the respective bearings with which the branch conduits are connected under different pressures.

12. An automobile lubricating system comprising in combination with the chassis bearings of an automobile, a source of lubricant supply, a header in communication with the source of supply, a main conduit leading from said source of supply and terminating in an outlet, a valve controlling communication between the header and the main conduit and a plurality of branch conduits connected to the outlet from the main conduit and having bores of different cross-sectional areas whereby lubricant is supplied to the respective bearings with which the branch conduits are connected under different pressures, said branch conduits being of different lengths whereby varying quantities of lubricant are supplied to the respective bearings.

Signed at New York city, in the county of New York, and State of New York, this 4th day of November, A. D. 1921.

FREDERICK H. GLEASON.